United States Patent [19]

Speranza et al.

[11] Patent Number: 5,082,924
[45] Date of Patent: Jan. 21, 1992

[54] POLYAMIDE-ESTER FROM POLYETHYLENE GLYCOL MONOAMINE AND CATALYTIC PROCESS THEREFOR

[75] Inventors: George P. Speranza, Austin; Jiang-Jen Lin, Houston, both of Tex.

[73] Assignee: Texaco Chemical Company, White Plains, N.Y.

[21] Appl. No.: 465,290

[22] Filed: Jan. 16, 1990

[51] Int. Cl.$^5$ .............................................. C08G 69/44
[52] U.S. Cl. .................................. 528/339; 528/332; 528/335; 528/336; 528/347
[58] Field of Search ............... 528/339, 335, 347, 336, 528/332

[56] References Cited

U.S. PATENT DOCUMENTS

| | | | |
|---|---|---|---|
| 4,123,422 | 10/1978 | Erikson et al. | 528/273 |
| 4,373,085 | 2/1983 | Bolze et al. | 528/291 |
| 4,397,991 | 8/1983 | Drawert et al. | 525/167 |
| 4,611,051 | 9/1986 | Hayes et al. | 528/295.3 |
| 4,617,342 | 10/1986 | Poppe et al. | 524/606 |
| 4,656,242 | 4/1987 | Swan et al. | 528/295.3 |

OTHER PUBLICATIONS

H. Wenker, "The Synthesis of Δ$^2$-Oxazolines and Δ$^2$-Thiazolines from N-Acyl-2-Aminoethanols," *J.A.C.S.*, vol. 57, Jun, 1935, pp. 1079–1080.
Texaco Chemical Company Data Sheet, "Amides from Diglycolamine® Agent," 1981.
J. R. Flesher, Jr., "Polyether Block Amide: High-Performance TPE," *Modern Plastics*, Sep. 1987, pp. 100–110.

*Primary Examiner*—Harold D. Anderson
*Attorney, Agent, or Firm*—Jack H. Park; Kenneth R. Priem; David L. Mossman

[57] ABSTRACT

Polyamide-esters may produce by reacting a polyethylene glycol monoamine with one or more dicarboxylic acids. Two methods may be employed: (1) the polyethylene glycol monoamine may be reacted with at least two different dicarboxylic acids simultaneously, or (2) the polyethylene glycol monoamine may be reacted with a first dicarboxylic acid in a first step to form an adduct, and then reacting the adduct with a second dicarboxylic acid to form the polyamide-esters, where the first and second dicarboxylic acids may be the same or different. Suitable dicarboxylic acids include, adipic acid; terephthalic acid; isophthalic acid; t-butyl isophthalic acid; 1,1,3-trimethyl-5-carboxy-3-(p-carboxyphenyl) indane, also known as phenylindane dicarboxylic acid (PIDA); naphthalenic dicarboxylic acid and mixtures thereof. Suitable polyethylene glycol monoamines include diethylene glycol monoamine, triethylene glycol monoamine and tetraethylene glycol monoamine. Terephthalic acid is a preferred acid, and in one embodiment gives polyamide-esters with the formula

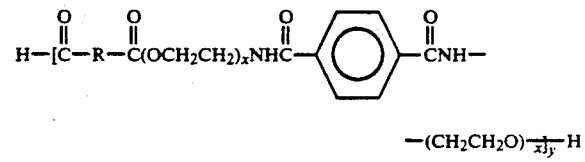

where R is an alkyl or aryl group having from 3 to 34 carbon atoms, x ranges from 2 to 6, and y ranges from about 2 to about 50.

11 Claims, No Drawings

POLYAMIDE-ESTER FROM POLYETHYLENE GLYCOL MONOAMINE AND CATALYTIC PROCESS THEREFOR

CROSS-REFERENCES TO RELATED APPLICATIONS

This application is related to U.S. patent application Ser. No. 07/456,666, U.S. Pat. No. 5,003,174 relating to the bis-hydroxy diamides made from polyethylene glycol monoamines, where the diamides can be used in making the novel polyamide-esters of the subject invention.

FIELD OF THE INVENTION

The invention relates to by-products from the manufacture of polyoxyalkyleneamines, and, in one aspect, more particularly relates to polyamide esters prepared by the reaction of such by-products with carboxylic acids.

BACKGROUND OF THE INVENTION

Triethylene and tetraethylene glycol diamines may be continuously produced from glycols catalytically. The triethylene glycol diamine and tetraethylene glycol diamine products are known under the trade names JEFFAMINE ® EDR-148 Amines and JEFFAMINE ® EDR-192 Amines, respectively, as made by Texaco Chemical Co. These materials are useful as intermediates in the preparation of hydrophilic nylon resins, and as epoxy curing agents. However, in the production of polyethylene glycol diamines, due to moderate conversions, there are also produced significant quantities of by-products, bottoms products or residues, and it would be beneficial if uses for these materials, such as triethylene glycol monoamine and tetraethylene glycol monoamine, could be discovered.

It is, of course, known to react materials having active hydrogens with compounds having carboxylic acid groups. For example, U.S. Pat. No. 4,123,422 teach amide modified saturated polyester polyols where the polyester polyol backbone is made from a polyhydric alcohol having 2 to 15 carbon atoms and a polybasic carboxylic acid having 4 to 14 carbon atoms. After the backbone is formed, it is modified with a primary or secondary amine of the formula $N(H)(R)_a(C_yH_{2y}OH)_b$, where R is a hydrogen or an alkyl group of 1 to 4 carbon atoms, y is 2 or 3, a is 0 or 1, b is 1 or 2, and the sum of a+b is 2. These amine modified saturated polyester polyols are useful in two-package urethane coating systems. A crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40, according to U.S. Pat. No. 4,617,342.

Hot melt adhesives are also related to these kinds of materials. For example, U.S. Pat. No. 4,656,242 describes that poly(ester-amide) polymers made from an acid component and a substantially equivalent amount of an amine and a diol component are suitable as hot melt adhesives for bonding plastics. The acid component has 10–80 equivalent percent of a polymeric fatty acid and 40–90 equivalent percent of a linear dicarboxylic acid. The amine and diol component has from 40–90 equivalent percent of an organic diamine and 10–60 equivalent percent of a diol. Also of interest is U.S. Pat. No. 4,611,051 which teaches poly(ester-amide) hot-melt adhesives prepared from condensation of a mixture of polymeric fatty acids and 1,18-octadecanedicarboxylic acid, and a substantially equivalent proportion of a mixture of a polyamine and a polyol. Suitable polyamines include ethylenediamine, 1,3-propanediamine, 1,4-butanediamine, 1,6-hexamethylenediamine, piperazine, and 4,4'-methylene-bis-(cyclohexylamine). Appropriate diols are ethylene glycol, 1,3-propanediol, 1,4-butanediol, 1,6-hexamethylenediol, cyclohexanemethanol, polyethylene glycol and polybutylene glycol.

In U.S. Pat. No. 4,373,085 polyesteramides are prepared by condensing (A) dimerized fatty acids having 16 to 44 carbon atoms, (B) a diamine having a formula of $NH_2$—R—$NH_2$ where R is an aliphatic hydrocarbyl having 2 to 36 carbon atoms and (C) aminoethoxyethanol and at least one dicarboxylic acid having the formula R"OOC—R'—COOR" where R' is a hydrocarbyl of 4 to 12 carbon atoms and R" is H or alkyl having 1 to 8 carbon atoms. U.S. Pat. No. 4,397,991 describes similar products. The polyesteramides are used as adhesives which combine good elongation, quick setting times and good low temperature flexibility.

A good, general background article about these amide materials is J. R. Flesher, Jr., "Polyether Block Amide: High-Performance TPE," *Modern Plastics*, September, 1987, pp. 100–110, where the family of engineering-grade thermoplastic elastomers based on block copolymers of polyethers and polyamides is discussed.

SUMMARY OF THE INVENTION

Accordingly, it is an object of the present invention to provide novel polyamide-esters and processes for their production.

It is another object of the present invention to provide a process for the production of polyamide-esters that employs by-products from the manufacture of polyethylene glycol polyamines.

Another object of the invention to provide a method for making these polyamide-esters that is relatively straight-forward.

In carrying out these and other objects of the invention, there is provided, in one form, novel polyamide-esters produced by reacting a polyethylene glycol monoamine having the formula $NH_2$—$(CH_2CH_2O)_x$—H, where x ranges from 2 to 6, with a first dicarboxylic acid and a second dicarboxylic acid to form the polyamide-esters. The first and second dicarboxylic acids are selected from the group of aliphatic and aromatic dicarboxylic acids, where the first and second acids may be the same or different if they are both aromatic, and where the first and second acids must be different if they are both aliphatic.

DETAILED DESCRIPTION OF THE INVENTION

It has been discovered that a series of mixed polyamide-esters may be prepared from polyethylene glycol monoamines, such as triethylene glycol monoamine (TEGMA) and tetraethylene glycol monoamine (T₄EGMA), which are by-products from the preparation of ethylene glycol diamines (the JEFFAMINE ® EDR-series amines) as described above, according to a reaction scheme such as the one schematically set forth below:

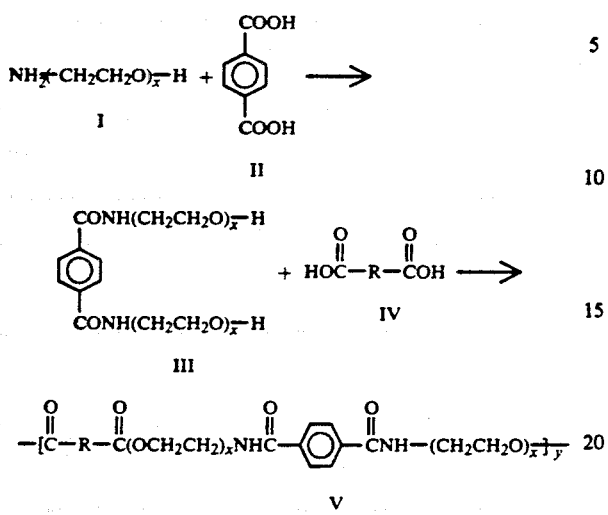

where R is an alkyl or aryl moiety having from 3 to 10 carbon atoms, where x ranges from 2 to 6, and y ranges from 2 to 50. Compound (I) refers to the suitable polyethylene glycol monoamine by-products useful as reactants herein, where x has the same definition as above, and compound (II) is obviously terephthalic acid. Compound (III) is a novel bis-hydroxy amide described more completely in companion patent application Ser. No. 07/465,666, U.S. Pat. No. 5,003,174, incorporated by reference herein. In this invention, compound (III) is next reacted with an additional dicarboxylic acid (IV) where R is as defined above, but different than or the same as terephthalic acid, to give the compound (V) of the present invention. This two-step process is believed to be novel in the preparation of these materials.

The compounds of this invention, such as compound (V), may also be defined as having the formula:

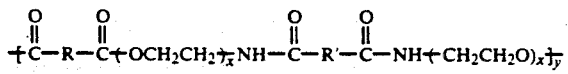

where R and R' represent dicarboxylic acid radicals, each having from 3 to 34 carbon atoms, where if both R and R' represent aliphatic dicarboxylic acids R and R' must be different, and if R and R' represent aromatic dicarboxylic acids, R and R' may be the same or different; x ranges from 2 to 6; and y ranges from about 2 to about 30. The terms R and R' in one aspect may have from about 4 to about 10 carbon atoms. The term x may be defined somewhat less broadly as ranging from about 2 to about 5 in one aspect, and from about 3 to about 4 in another embodiment. The term y may be defined in another aspect as from about 3 to about 20.

The compounds (V) or polyamide-esters may also be produced by reacting terephthalic acid, or other first dicarboxylic acid, with a second dicarboxylic acid of the formula HOOC—R—COOH and a polyethylene glycol monoamine having the formula $NH_2$—$(CH_2CH_2O)_x$—H. This latter method is a one-step approach as opposed to the two-stage approach outlined in the preceding paragraph. In these definitions, x may in its broadest embodiment range from 2 to 6, and in another embodiment range from 2 to 5, and in its preferred embodiment range from 3 to 4. With respect to the suitable dicarboxylic acids, R in one aspect may be an alkyl or aryl group having from 3 to 10 carbon atoms, and in another aspect from 4 to 9 carbon atoms.

Suitable carboxylic acids include, but are not limited to adipic acid; sebacic acid; azelaic acid; terephthalic acid; isophthalic acid; t-butyl isophthalic acid; 1,1,3-trimethyl-5-carboxy-3-(p-carboxyphenyl) indane, also known as phenylindane dicarboxylic acid (PIDA); naphthalenic dicarboxylic acid and mixtures thereof. The first and second dicarboxylic acids may be the same as each other or different, however, if both the first and second dicarboxylic acids are aliphatic, they must be different. If the first and second dicarboxylic acids are aromatic, they may be the same or different. For example, the aromatic dicarboxylic acids may have the formula:

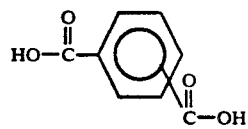

In the reaction of this invention, by either the one-stage or two-stage method, the temperature may range from about 220° to about 290° C. and more preferably from about 240° to about 260° C. The suitable pressure conditions may range from about 1 mm to about 760 mm. Appropriate catalysts for the one-stage method or the second stage of the two-stage method include, but are not limited to Ti(O—i—Pr)$_4$—titanium isopropoxide; other alcoholates of titanium such as tetra-butyl titanium derivatives; indeed compounds of the formula Ti(OR)$_4$ where R is an alkyl radical having from 1 to 8 carbon atoms; metal salts of carboxylic acids such as zinc, antimony and manganese esters and acetates, and mixtures thereof.

The invention will be illustrated further with respect to the following non-comprehensive, specific examples.

EXAMPLE 1

Polyamide-ester from Terephthalic Acid—TEGMA Adduct and Terephthalic Acid (1:1)

To a 250-ml, 3-necked flask equipped with a thermometer, a Dean-Stark trap, a stirrer and nitrogen-inlet line were charged the 1:2 adduct of terephthalic acid—TEGMA (81.0 g., 0.186M) and terephthalic acid (24.9 g.; 0.15M) and Ti(O—i—Pr)$_4$ (0.53 g.). The mixture was heated to 200°–220° C. for 2 hours, 220°–240° C. for two hours, and 240° C. for 20 minutes under vacuum. The product was a brown, hard solid. The H-nmr analysis showed the structure of a polyamide-ester.

EXAMPLE 2

Polyamide-ester from Terephthalic Acid—TEMGA Adduct and Adipic Acid (1:1)

Similar procedures to those of Example 1 were used herein, except that the 81.0 g. (0.186M) of the adduct was used together with 27.2 g. (0.186M) of adipic acid and Ti(O—i—Pr)$_4$ (0.5 g.). Under conditions of 200°–220° C. for 2 hours, 220°–245° C. for two hours and 240° C. under vacuum for 20 minutes, the product produced was a soft, deep brown solid. The H-nmr analysis verified the structure of a polyamide-ester.

EXAMPLE 3

Polyamide-ester from Terephthalic Acid and TEGMA (1:1 molar ratio)

To a 250-ml 3-necked flask equipped with a thermometer, a Dean-Stark trap, a stirrer and nitrogen-inlet line were charged terephthalic acid (66.4 g., 0.4M) and TEGMA (59.6 g., 0.4M). The mixture was heated to 220° C. for 2 hours and 245°-250° C. under vacuum for 2 hours. The product was a tacky, brown solid.

EXAMPLE 4

Polyamide-ester from Terephthalic Acid and TEGMA (1:1 molar ratio)

The experimental procedures of Example 3 were repeated except 0.6 ml Ti(O—i—Pr)$_4$ was used as a catalyst, and conditions of 1 hour at 185° C., followed by 240°-250° C. under vacuum of 1 hour were employed. A tacky, brown solid product, insoluble in water, methanol or acetone was obtained.

EXAMPLE 5

Polyamide-ester from Terephthalic Acid, Adipic Acid and T$_4$EGMA (1:1:2 molar ratio)

To a 250-ml, 3-necked flask equipped with a thermometer, a Dean-Stark trap, a magnetic stirrer and nitrogen-inlet line were charged the terephthalic acid (24.9 g., 0.15M), adipic acid (21.9 g., 0.15M), tetraethylene glycol monoamine (T$_4$EGMA, from Texaco Chemical Co.; 57.9 g., 0.30M) and Ti(O—i—Pr)$_4$ (0.52 g.). The mixture was heated to 200° C. for 2 hours, 230° C. for two hours, and then subjected to reduced pressure for 30 minutes at 230° C. A grey-colored, soft solid (87 g.) was recovered. The H-nmr analysis indicated the structure of a polyamide-ester composition.

EXAMPLE 6

Polyamide-ester from Terephthalic Acid—T$_4$EGMA Adduct and Adipic Acid (1:1 molar ratio)

To a 250-ml, 3-necked flask equipped with a thermometer, a Dean-Stark trap, a magnetic stirrer and nitrogen-inlet line were charged the adduct of terephthalic acid-tetraethylene glycol monoamine (51.5 g., 0.2M), adipic acid (14.6 g., 0.2M) and Ti(O—i—Pr)$_4$ (0.33 g.). The mixture was heated to 220° C. for 2 hours, 240° C. for two hours, and under highly reduced pressure for 30 minutes at 240° C. An amber, soft solid (46 g.) was obtained. The H-nmr analysis indicated the structure of a polyamide-ester.

It may thus be seen that novel polyamide-esters may be made according to two methods of this invention. These materials may be used alone as solids or copolymerized with other materials.

It is possible to prepare linear polyester polyamides from 1:1 molar ratios of aliphatic dicarboxylic acids and polyglycol amines when the dicarboxylic acid groups fall outside the family of glutaric, adipic and pimelic. For example, when sebacic acid was allowed to react with diethylene glycol monoamine for 2 hours at 200°-242° C. a linear polyester polyamide was prepared with a molecular weight of 2000. In another preparation, when sebacic acid was heated with triethylene glycol monoamine at 240° C. for four hours and at 200° C. and one mm for 30 minutes, a white solid melting at 62°-63° C. was obtained. Its ester to primary hydroxyl ratio (by NMR) was 6:1 indicating largely linear product.

Many modifications may be made in the process of this invention without departing from the spirit and scope thereof which are defined only in the appended claims. For example, one skilled in the art may discover a new catalyst, or reaction condition, which may not be explicitly recited herein, but which is nevertheless anticipated, and which would give desirable results.

GLOSSARY

DGA—Diethylene glycol monoamine (DEGMA) or Diglycolamine® Agent made by Texaco Chemical Company.

TEGMA—Triethylene glycol monoamine.

T$_4$EGMA—Tetraethylene glycol monoamine.

T(O—i—Pr)$_4$—Titanium isopropoxide

We claim:

1. A polyamide-ester produced by a process consisting essentially of reacting a polyethylene glycol monoamine having the formula NH$_2$—(CH$_2$CH$_2$O)$_x$—H, where x ranges from 2 to 6, with a first dicarboxylic acid and a second dicarboxylic acid to form the polyamide-ester, where the first and second dicarboxylic acids are independently selected from the group of dicarboxylic acids consisting of aliphatic and aromatic dicarboxylic acids, where the first and second acids are the same or different when they are both aromatic, and where the first and second acids must be different when they are both aliphatic, and where the polyamide-ester is a solid at room temperature.

2. The polyamide-ester of claim 1 where x in the formula NH$_2$—(CH$_2$CH$_2$O)$_x$—H, x ranges from 3 to 4.

3. The polyamide-ester of claim 1 where the dicarboxylic acids have the formula HOOC—R—COOH, where R is alkylene or arylene having from about 4 to about 34 carbon atoms.

4. The polyamide-ester of claim 1 where one of the dicarboxylic acids is terephthalic acid.

5. A polyamide-ester having repeating units of:

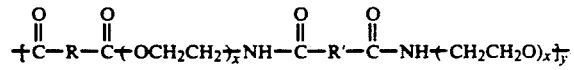

where R and R' independently represent dicarboxylic acid radicals each having from 3 to 34 carbon atoms, when both R and R' represent aliphatic dicarboxylic acid radicals R and R' must be different, and when both R and R' represent aromatic dicarboxylic acid radicals, R and R' are the same or different; x ranges from 3 to 4; and y ranges from about 2 to about 30, and where the polyamide-ester is a solid at room temperature.

6. The polyamide-ester of claim 5 where R and R' each have from 4 to 10 carbon atoms, x ranges from 3 to 4, and y is about 3 to about 20.

7. A polyamide-ester having the formula:

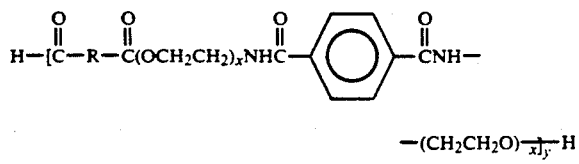

where R is an alkylene or arylene group having from 3 to 34 carbon atoms, x ranges from 2 to 6, and y ranges from about 2 to about 30, and where the polyamide-ester is a solid at room temperature.

8. The polyamide-ester of claim 7 where R has from about 4 to 10 carbon atoms, x ranges from 2 to 5, and y ranges from about 2 to about 30.

9. The polyamide-ester of claim 7 where R has from about 4 to 10 carbon atoms, x ranges from 3 to 4, and y ranges from about 3 to about 20.

10. A process for producing a polyamide-ester consisting essentially of the steps of:

reacting a polyethylene glycol monoamine having the formula $NH_2-(CH_2CH_2O)_x-H$, where x ranges from 2 to 6, with a first dicarboxylic acid to form an adduct; and reacting the adduct with a second dicarboxylic acid to form the polyamide-esters in the presence of a catalyst selected from the group consisting of $Ti(OR)_4$ where R is an alkyl radical having from 1 to 8 carbon atoms; zinc, antimony and manganese salts of carboxylic acids, and mixtures thereof, where the first and second dicarboxylic acids are independently selected from the group of dicarboxylic acids consisting of aliphatic and aromatic dicarboxylic acids, where the first and second acids are the same or different when they are both aromatic, and where the first and second acids must be different when they are both aliphatic, and where the polyamide-ester is a solid at room temperature.

11. A process for producing a polyamide-ester consisting essentially of the steps of:

reacting a polyethylene glycol monoamine having the formula $NH_2-(CH_2CH_2O)_x-H$, where x ranges from 3 to 4, with a first dicarboxylic acid in the absence of a catalyst, but in the presence of heat, to form an adduct; and reacting the adduct with at least one second dicarboxylic acid in the presence of a catalyst selected from the group consisting of $Ti(OR)_4$ where R is an alkyl radical having from 1 to 8 carbon atoms; zinc, antimony and manganese salts of carboxylic acids, and mixtures thereof to form the polyamide-esters, where the first and second dicarboxylic acids are independently selected from the group of aliphatic and aromatic dicarboxylic acids, where the first and second acids are the same or different when they are both aromatic, and where the first and second acids must be different when they are both aliphatic, and where the polyamide-ester is a solid at room temperature.

* * * * *